Patented Apr. 17, 1928.

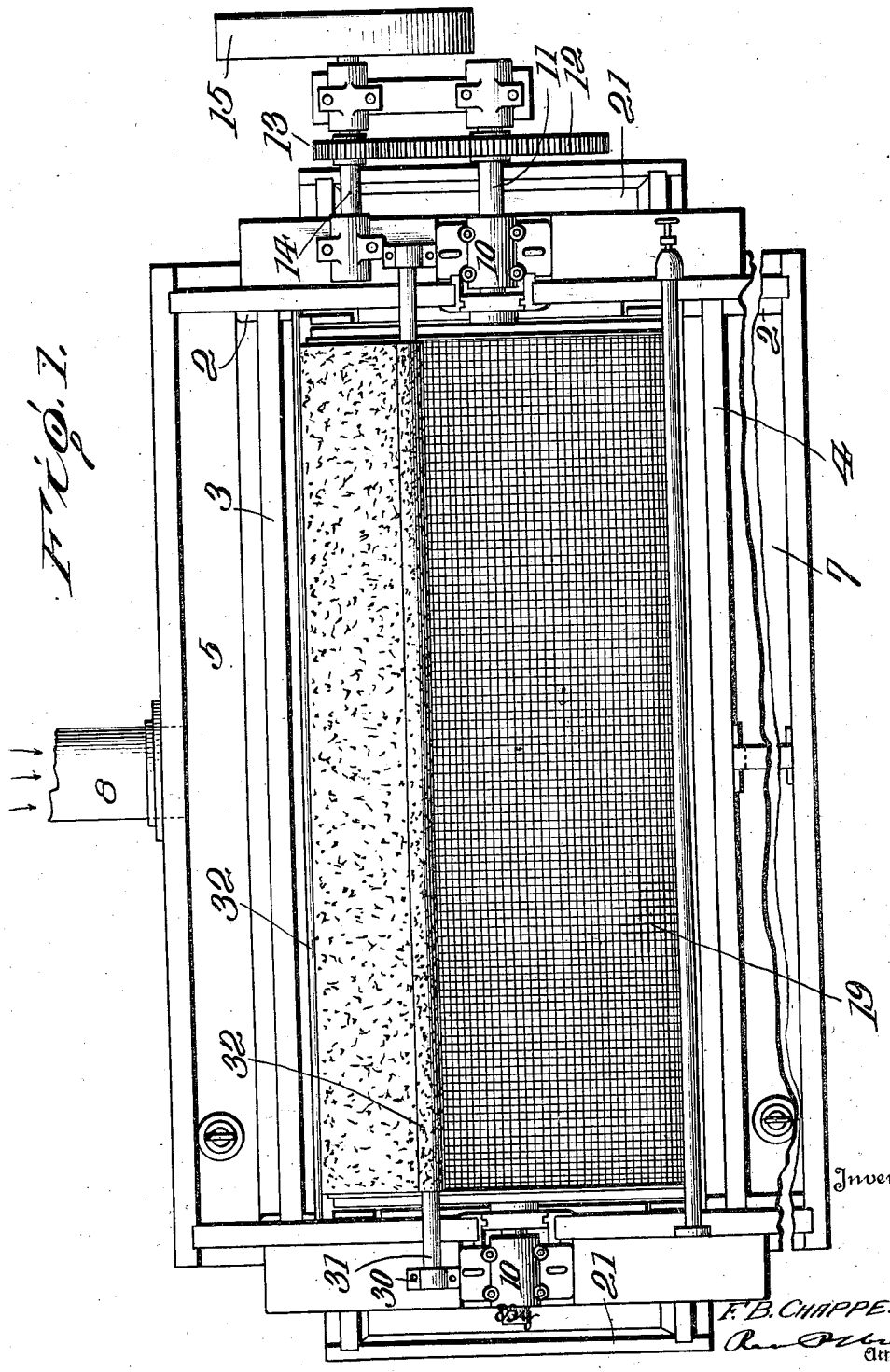

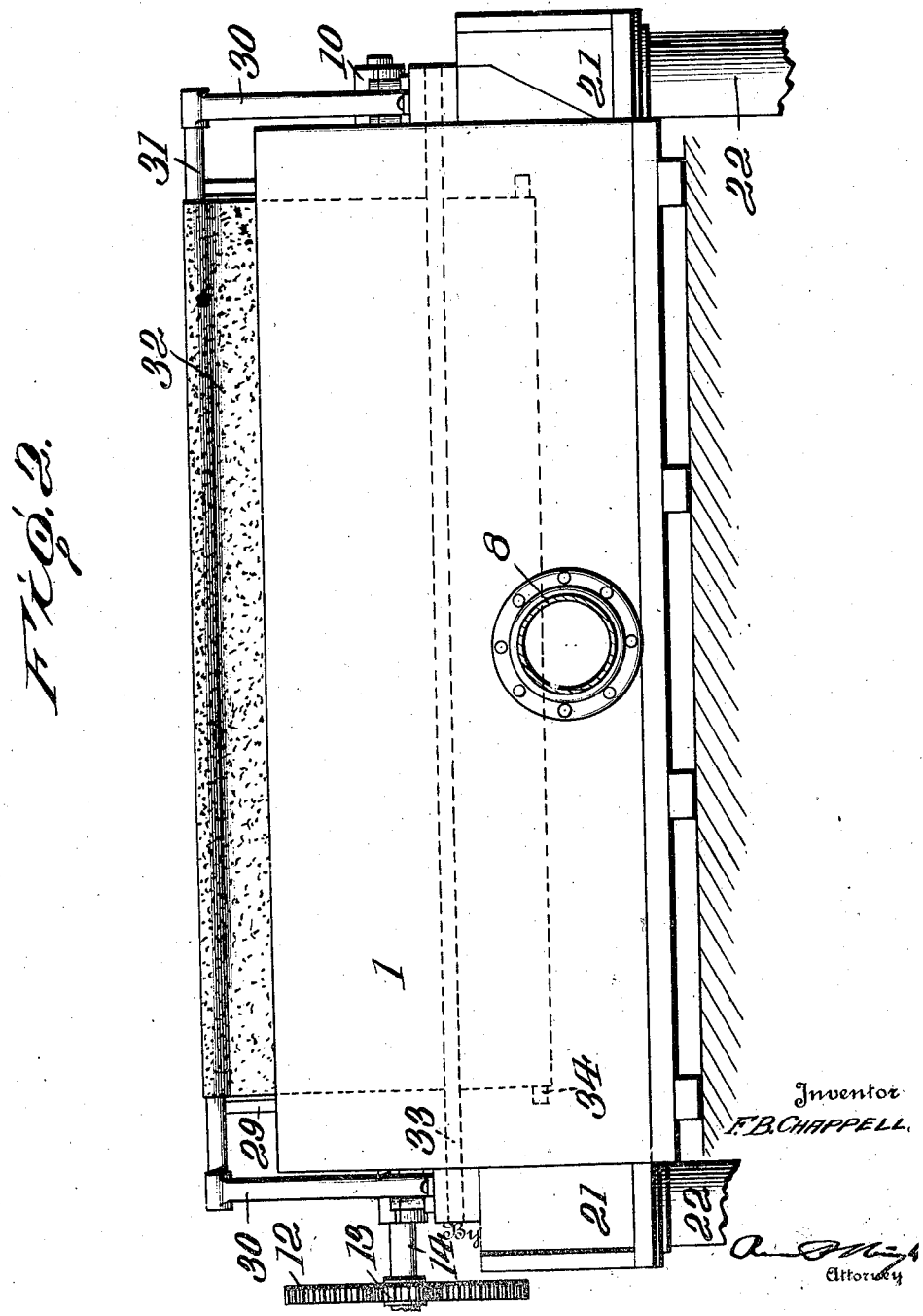

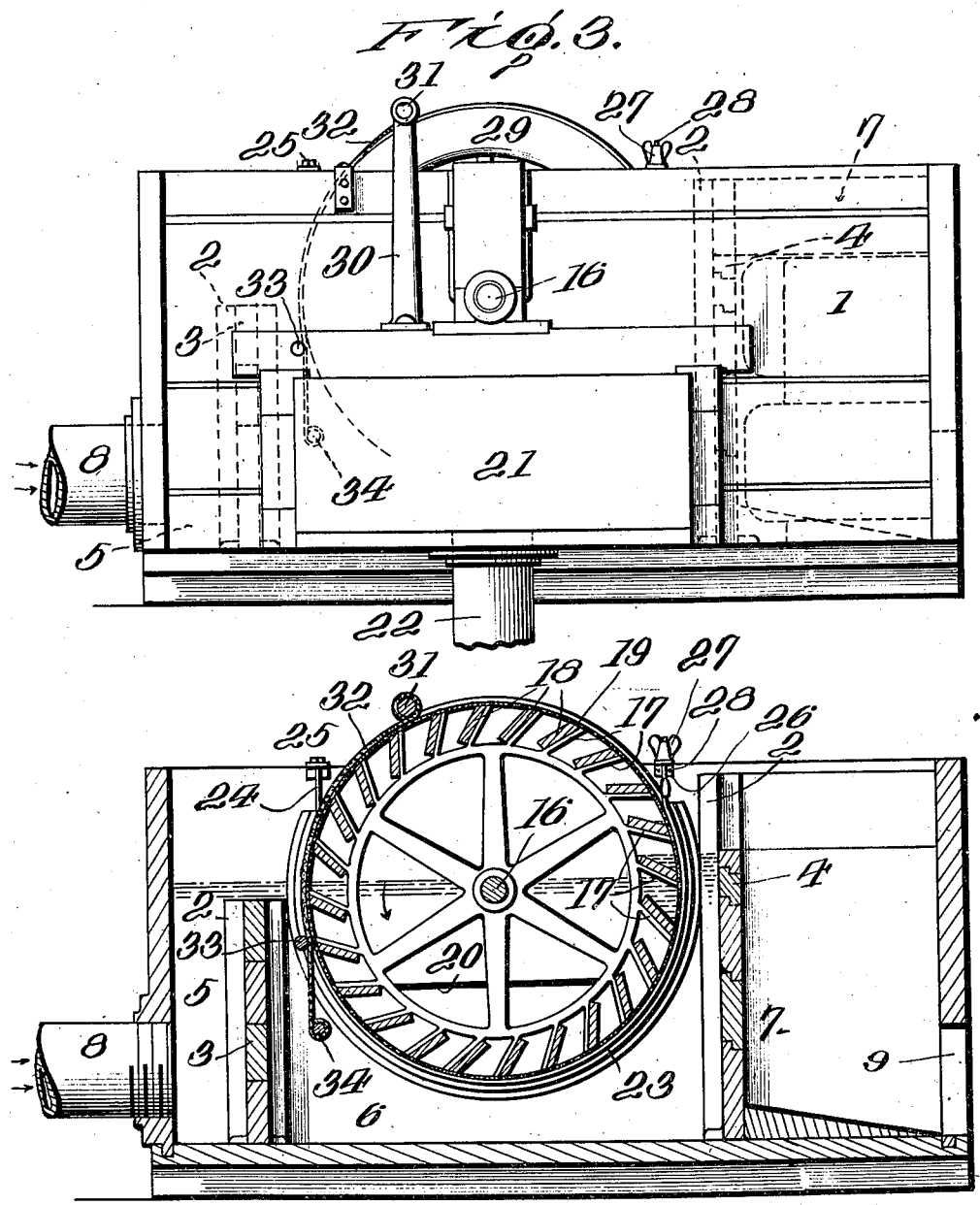

1,666,164

UNITED STATES PATENT OFFICE.

FRED B. CHAPPELL, OF GLENS FALLS, NEW YORK, ASSIGNOR OF ONE-HALF TO GLENS FALLS MACHINE WORKS, OF GLENS FALLS, NEW YORK, A CORPORATION OF NEW YORK.

APPARATUS FOR AERATING AND SCREENING LIQUID.

Application filed April 11, 1922. Serial No. 551,564.

This invention relates to a method of and apparatus for aerating and screening liquid such as sewage and waste liquids of all kinds, or for removing foreign substances from liquid, the object being to provide a method by means of which the liquid containing the foreign matter will be aerated and screened either separately or simultaneously.

Another object of my invention is to provide an apparatus for and method of efficiently and economically screening and aerating sewage as in the activated sludge treatment of sewage, or in any other trade waste treatment in which it is desirable or necessary to remove the large cloggable or undesirable solids and retain the other elements, and in which it is desirable or necessary to aerate and agitate the liquid to promote the development of bacterial or biologic growth for the purification of the sewage.

Another object of my invention is to provide an apparatus which is exceedingly simple and cheap in construction, the parts being so arranged that a very strong and durable apparatus is formed and one in which the aeration and screening of the liquid is accomplished by a foraminous cylinder which is rotated continuously in order to allow the screened liquor or liquid to pass freely through the foraminated surface and out one or both ends of the cylinder and the foreign matter to be collected on the periphery of the cylinder and discharged in such a manner that the meshes of the foraminous cylinder are kept clean.

Another object of the invention is to provide a construction of apparatus in which pockets or buckets are employed for the purpose of carrying a portion of the liquid for flushing through the foraminous surface from the inside and throwing off the foreign matter collected, and collecting air which is carried downwardly and discharged into the receptacle so as to aerate the liquid therein.

Other and further objects and advantages of the invention will be hereinafter set forth and the novel features thereof defined by the appended claims.

In the drawings,

Figure 1 is a top plan view of an apparatus constructed in accordance with my invention for carrying out my method of aerating and screening liquid;

Figure 2 is a side elevation of the apparatus;

Figure 3 is an end view; and

Figure 4 is a transverse vertical section.

In carrying out my invention I employ a receptacle or vat 1, the ends of which on the interior are provided with vertically disposed cleats or members 2 forming guideways in which are adjustably mounted partition boards 3 and 4 forming chambers 5, 6 and 7, the chamber 5 being provided with an inlet 8, the chamber 6 being that in which the cylinder revolves and the aerating and screening takes place, and the chamber 7 with outlet 9 and means for draining and removing in any suitable manner, the matter collected.

The liquid to be aerated and screened enters the chamber 5 through the inlet 8 and overflows the partition 3 and is maintained at any desirable level as compared with the height of the liquid passing over partition 4 to produce a hydrostatic head sufficient for screening.

Arranged on the end of the vat upon suitable supports are bearings 10 in which is revolubly mounted a shaft 11 herein shown provided with a gear 12 meshing with a gear 13 on a countershaft 14, which is provided with a drive pulley 15, but it is, of course, understood that the shaft 11 can be driven by any suitable means.

Fixed on the shaft are spiders 16 and in constructing a screening cylinder as herein shown and described, I employ two or more spiders, the rims being provided with tangentially arranged veins 17 to which are connected slats or staves 18 connecting the respective veins of the spiders, these veins extending at an angle to the radius thereof as clearly shown.

Arranged over the outer edges of the slats or staves, is a foraminous covering 19 which forms in connection with the spiders and veins, a foraminated screening cylinder having a plurality of pockets or buckets below the foraminated surface, which fill with liquid, so that when the pockets containing the liquid reach the discharging level within the chamber 6, it flows outwardly so as to carry the foreign matter collected on the periphery of the cylinder over the partition 4 into the chamber 7 where it can be collected, drained and removed. As this liquid flows through the foraminated surface of the cylinder, it not only carries the matter collected on the periphery thereof from off the cylinder, but it cleans and maintains the openings of the foraminated surface in a clean condition, so that when it again descends into the liquid to be screened, the openings are practically unobstructed.

Each end of the receptacle 1 is provided with an opening 20 out through which the screened liquid flows, a casing 21 being arranged on the outside of each opening forming a receiving chamber for the screened liquid, each of these chambers being provided with an outlet 22 having an adjustable gate or any other suitable means of controlling the height of the liquid in and the flow from the cylinder.

In order to make the ends of the cylinder water tight, I arrange between the ends of the cylinder and the ends of the vat a packing strip 23 of any suitable material connected at one end by a bolt 24 and a bracket 25, the opposite end being connected to a bolt 26 extending through a bracket 27 and on which is mounted a wing nut 28 in order to apply tension to the packing strip.

The above construction of apparatus for screening liquids is old in the art, and I have not gone into a detailed description of the apparatus herein shown, as I am aware that various changes can be made without departing from the spirit of my invention which is the combining with such an apparatus means for aerating the liquid as it is strained and which will hereinafter be fully described.

I have found that by sealing the pockets prior to and until they are submerged in the liquid to be separated, that the air within the pockets will be carried downwardly into the liquid within the chamber and be forced out through the liquid so as to aerate and agitate the liquid to be separated, which allows the development of the biologic growths, keeps all elements in suspension preventing the heavy solids from settling to the bottom of receptacle, thereby increasing screening efficiency and by this action of the air through the foraminated surface of the cylinder the openings are again subjected to a cleaning action.

In constructing an apparatus as hereinbefore described, I arrange over each end of the cylinder thus formed a ring 29, which seals the ends of the pockets between the arms of the spiders and the foraminous covering. Secured to the supports on which the bearings of the shaft of the cylinder are mounted, I arrange standards 30 herein shown provided with tubular sleeves at their ends in which is arranged a rod 31 to which is connected a blanket or felt 32, which extends around a portion of the cylinder as clearly shown over a guide roller 33, and has a weighted rod 34 connected to its lower end for applying tension to the same in order to hold the blanket closely against the foraminated surface.

This blanket becomes soaked or filled with water and seals that portion of the foraminated surface over which the blanket is arranged and as the cylinder is rotating continuously in the direction of the arrow, the pockets which are filled with liquid, are emptied when they reach approximately the discharging level of the solids within the chamber 6, which, of course, can be determined by the height of the partition 4. They then fill with air and the air within the pockets is trapped and carried downwardly and discharged into the liquid within the chamber 6 so as to agitate and aerate the liquid as hereinafter explained, and as the liquid is flowing through a portion of the foraminated surface continuously, that within the cylinder passes out the ends and the solid matter adheres to the periphery of the cylinder and is carried upwardly and discharged into the receiving chamber as will be hereinafter fully described.

In using the term blanket, to designate the seal, it is used in a broad or mechanical sense, and I am aware that various methods of temporarily closing the openings of the foraminated surface at the position stated, can be used and various materials employed, without departing from the spirit of that part of my invention which is to provide an effective seal.

In carrying out my method on an apparatus as herein shown and described, the liquid to be screened, which may be sewage or trade waste liquid or any other liquid, is fed through the inlet 8 into the chamber 5 and overflows into the screening chamber 6 where the revolving foraminated cylinder is rotating continuously.

The partition 3 distributes the liquid and as the liquid is flowing continuously into the chamber 6, the current is toward the opposite or discharge side and carries to that side the heavy solids, which are collected onto the periphery of the cylinder while the screened liquid is allowed to pass from within the cylinder out the ends of the receptacle and carried off.

As the cylinder is rotating continuously, the foreign matter, which collects on the periphery of the foraminated surface, is carried upwardly until it reaches approximately the level of the liquid within the chamber where it is subjected to the action of the fluid within the pockets so as to force the matter from off the periphery of the cylinder over partition 4 into the receiving chamber and this fluid which collects within these pockets, not only forces the matter off the foraminated surface but clears the openings of the foraminated surface.

As the liquid within the pockets is discharged therefrom, they immediately fill with air which is carried under the sealing member so as to trap the air within the pockets and as the pockets descend, the air is carried downwardly below the surface of the liquid and discharged through the foraminous surface so as to aid in cleaning the mesh of the surface, and to agitate and aerate the liquid within the screening chamber.

It will be seen that the pockets in an apparatus as herein shown and described carry up liquid as they ascend and carry air downwardly as they descend, performing the double function of hydrostatically removing the foreign matter therefrom and aerating and agitating the sewage or liquid to be screened.

What I claim is:—

1. An apparatus of the kind described comprising a receptacle, a foraminated cylinder revolubly mounted in said receptacle having a plurality of pockets disposed beneath the foraminous surface thereof, means for sealing said pockets, said pockets being adapted to collect water on the ascent of said pockets and to collect air on the descent of said pockets for aerating and cleaning the surface of said cylinder.

2. An apparatus of the kind described comprising a receptacle having a revoluble foraminated cylinder mounted therein, said cylinder being provided with pockets or buckets and a blanket or other means for sealing the openings of a portion of said cylinder and the pockets underneath said portion of said cylinder.

3. An apparatus of the kind described comprising a revolubly mounted cylinder having a foraminous surface, a plurality of pockets or buckets disposed within said cylinder under said surface and a blanket or any other sealing member disposed over a portion of said cylinder for trapping air in said pockets.

4. In an apparatus of the kind described, the combination with a receptacle into which the liquid to be screened is adapted to flow continuously, of a foraminated cylinder mounted within said receptacle having outlets at its ends, through which the clear liquid is adapted to flow, a plurality of pockets disposed within said cylinder under the foraminated surface thereof and a sealing member disposed around a portion of said cylinder.

5. In a strainer of the class described, the combination with a receptacle having a plurality of partitions forming chambers, a revolubly mounted foraminated cylinder mounted in one of said chambers having outlet at one or both ends, means for feeding liquid into said chamber and a plurality of pockets disposed within said cylinder for collecting liquid and air for removing the solid matter collected on the surface on the ascent of said pockets and to permit the discharge or expulsion of the air through said surface into the liquid to be screened on the descent of said pockets.

6. An apparatus for screening and aerating liquid comprising a receptacle having removable partitions arranged therein forming a plurality of chambers, the intermediate chamber being provided with a revolubly mounted cylinder having a foraminated surface, a plurality of pockets formed within said cylinder, means for effectively sealing the pockets under a portion of said cylinder, said pockets collecting liquid on the ascent for removing the foreign matter collected on the periphery of said cylinder and collecting air on the descent for aerating the liquid within said chamber.

7. A screening apparatus comprising a receptacle having a revolubly mounted cylinder provided with a foraminated periphery mounted therein through which the liquid to be strained is adapted to flow for collecting the solid matter of said liquid upon the periphery of said surface, said cylinder having a plurality of internal pockets for collecting liquid on the ascent of said pockets and discharging said liquid through the foraminated surface for removing the solid matter collected, a blanket surrounding a portion of said cylinder for trapping air in said pockets and to permit the discharge or expulsion of the air into the liquid of said receptacle for aerating the liquid.

8. An apparatus of the kind described comprising a receptacle having a revolubly mounted foraminated cylinder therein through which the liquid to be screened is adapted to flow continuously, said cylinder being provided with a plurality of internal pockets under the foraminated surface of said cylinder, a sealing member disposed around a portion of said cylinder for trapping air in said pockets and to permit the discharge or expulsion of the air into the liquid of said receptacle, said pockets collecting liquid and expelling said liquid through said foraminated surface for removing the solid matter collected on said surface.

9. An apparatus for aerating and screening liquid comprising a receptacle having means for continuously feeding and maintaining liquid at a predetermined level therein, a foraminated cylinder revolubly mounted in said receptacle through which the liquid is adapted to flow continuously, said foraminated cylinder being provided with a plurality of internal pockets, the periphery of said cylinder being disposed above the predetermined level of liquid therein, a blanket arranged around a portion of said cylinder for trapping the air collected in said pockets after that portion of the cylinder emerges from below the liquid level within said receptacle and to permit the discharge or expulsion of the air collected into said liquid, said pockets collecting liquid and expelling said liquid through the said foraminated surface for removing the solid matter collected thereon as said pockets travel upwardly.

10. An apparatus for aerating and screening liquid comprising a receptacle having a foraminated cylinder mounted therein provided with a plurality of pockets, means for sealing said pockets, said pockets being adapted to collect water as they move upwardly and to collect air as they move downwardly for aerating the liquid in said receptacle and for expelling the solid matter collected on the foraminated surface of said cylinder.

In testimony whereof I hereunto affix my signature.

FRED B. CHAPPELL.